March 19, 1968 J. MAZOYER 3,373,951

DRIVE MEANS FOR MINIATURE TAPE RECORDERS

Filed Nov. 5, 1965

2 Sheets-Sheet 1

INVENTOR

Jean Mazoyer

BY Stevens, Davis, Miller & Mosher

ATTORNEYS

INVENTOR
*Jean Mazoyer*
BY
*Stevens, Davis, Miller & Mosher*
ATTORNEYS

United States Patent Office 3,373,951

Patented Mar. 19, 1968

3,373,951

DRIVE MEANS FOR MINIATURE TAPE RECORDERS

Jean Mazoyer, 6 Rue des Clamarts, Nogent-sur-Marne, Seine, France

Filed Nov. 5, 1965, Ser. No. 506,486
6 Claims. (Cl. 242—55.13)

ABSTRACT OF THE DISCLOSURE

A drive system for miniature magnetic recorders, characterized by the fact that it comprises a symmetrical magazine containing a magnetic tape mounted on two reels. The reels each consist of a hub having a first flange rigidly connected on one end and a second flange engaged by friction on the other end. The mechanism for driving the tape and reels comprises, in combination, a capstan rigidly connected to a large wheel which is driven by frictional contact between its periphery and an electric micro-motor, the large wheel frictionally driving an inertia flywheel and an engaged wheel of the take-up reel; a presser roller mounted on an oscillating arm to press the magnetic tape against the capstan; a transmission roller, which rolls on the first flange of the feed reel and contributes to the braking thereof; and finally, a control member consisting of a movable part which in a first position displaces the oscillating arm to move the presser roller away from the capstan and, in a second position, elastically presses a small roller between the periphery of the flywheel and the periphery of the transmission roller so as to effect high speed rewinding of the magnetic tape.

In the production of tape recorders of very small dimensions such as pocket tape recorders, the major difficulty is in forming the drive mechanism for the tape which must be as simple and as small as possible. As a matter of fact, the miniaturizing of the electronic portions of the recorder does not raise any particular problem in view of the present transistor techniques. On the other hand, in order to simplify the handling of small size reels, interchangeable magazines, which must be as simple as possible and contain a minimum number of moving members, are generally employed.

The object of the present invention is to provide a novel drive device for miniature tape recorders, characterized essentially by the fact that it comprises a magazine which is symmetrical to an axis and contains therein the magnetic tape mounted on two reels. Each reel consists of a hub with a rigidly connected stationary flange on one end and a frictionally engaged flange on the other end. The drive mechanism for the tape and reels comprises, in combination: a capstan which is rigidly connected with a large wheel, the latter being driven by friction on its periphery by an electric micro-motor; the wheel also drives, by friction, an inertia flywheel and the engaged flange of the receiving spool; a pressure roller is mounted on a spring biased oscillating arm to press the magnetic tape against the capstan; a transmission roller, which rolls on the stationary flange of the feed spool, serves to contribute to the braking of the feed spool; and finally, a control member consisting of a movable part which, in a first position, displaces the oscillating lever so as to move the pressure roller away from the capstan and, in the second position, presses a small spring biased roller between the periphery of the inertia flywheel and the periphery of the transmission roller so as to effect the higher speed rewinding of the magnetic tape.

This arrangement may furthermore comprise the following features taken individually or in combination:

(1) A magazine locking lever is articulated on the same shaft as the oscillating lever so as to assure, upon loading, the locking-in position of the magazine. The lever acts on the oscillating lever in such a manner as to effect, upon unloading, the freeing of the magazine, the freeing of the presser roller and its lateral retraction to permit the longitudinal extraction of the magazine. A similar locking lever is preferably also placed on the other side of the magazine.

(2) The magazine is introduced and removed transversely, that is to say in the direction of the axis of the capstan, the roller therefore may be simply released by action on the control device.

(3) The magazine comprises a double brake acting on the flanges of the two reels, the action of which is neutralized under the effect of members which are rigidly connected with the housing of the apparatus or the locking levers.

In order that the object of the invention may be better understood, there shall now be described, by way of illustration and not of limitation, one embodiment taken as example and shown in the accompanying drawing in which.

Figure 1:
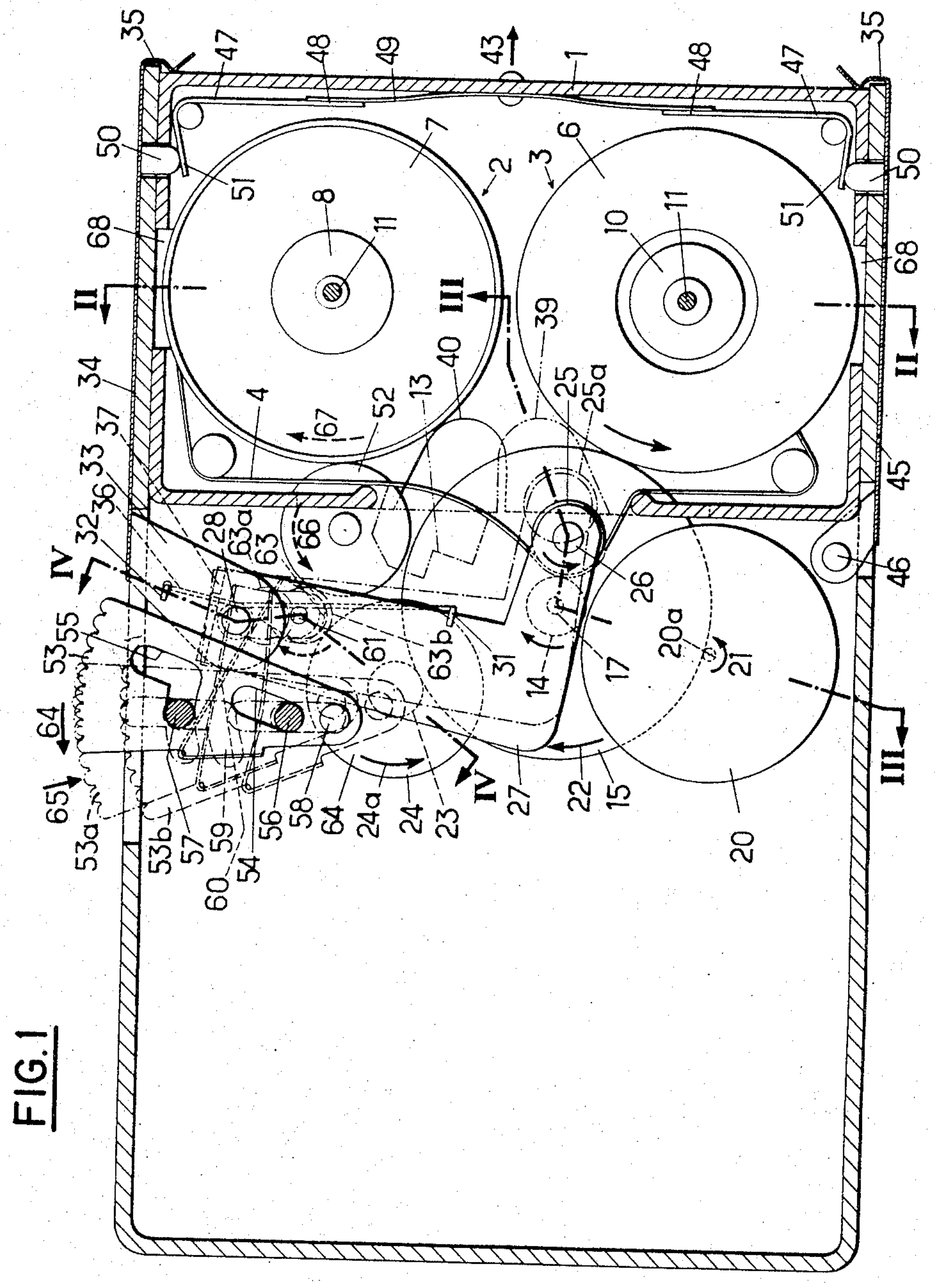
FIG. 1 is a horizontal section through the mechanism.
Figure 2:
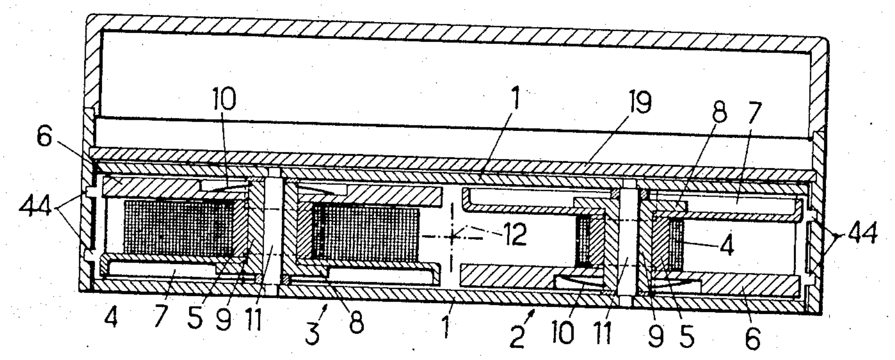
FIG. 2 is a transverse section along the line II—II of FIG. 1.

It can be seen, in particular from FIGS. 1 and 2, that the present invention employs a magazine consisting of a housing 1 containing two identical reels 2 and 3 on which the magnetic tape 4 is placed. Each of the reels consists of a hub 5 having a flange 6 rigidly connected to one end and a flange 7 wedged between the other end of the hub and the small collar 8 of a sleeve which passes through the hub 5 and fastened in place by an elastic washer 10. The hub 5 is driven by slight friction with the flange 7 while it is driven directly by the rigidly connected flange 6. The sleeve 9 furthermore has a bore therein for the passage therethrough of a pin 11 around which the reel can turn.

The magazine assembly is symmetrical to an axis 12 which is perpendicular to the plane of FIG. 2. The magnetic recording and playback head 13 is positioned on the tape 4 staggered by a certain amount with respect to the height of the axis so that, upon removing the magazine and replacing it in the inverted position, two different tracks of the tape may be successfully used without any mechanical complication.

The drive mechanism proper consists of a cylindrical capstan 14 rigidly and concentrically connected with a large wheel 15 which has a rubber covering 16 on its periphery. The wheel 15 turns freely on a pin 17 located between the outer wall 18 of the housing and an inner partition 19. The wheel 15 is driven in slow rotation by an electric micro-motor 20, the stub-shaft 20*a* of which rolls directly on the rubber covering 16. While the apparatus is under tension, the motor turns in the direction shown by the arrow 21 and the wheel 15 turns in the direction shown by the arrow 22.

The rubber covering 16 of wheel 15 rolls in permanent contact with the hub 23 of an inertia flywheel 24 which it drives in the direction 24*a* at a relatively higher speed. The flywheel, by its inertia, serves to stabilize the speed of rotation of the wheel 15 and of the capstan 14 so as avoid "wow." Finally, the wheel 15 also frictionally drives the engaged flange 7 of the reel 3 so as to freely wind up the magnetic tape fed by the capstan 14.

Figure 4:
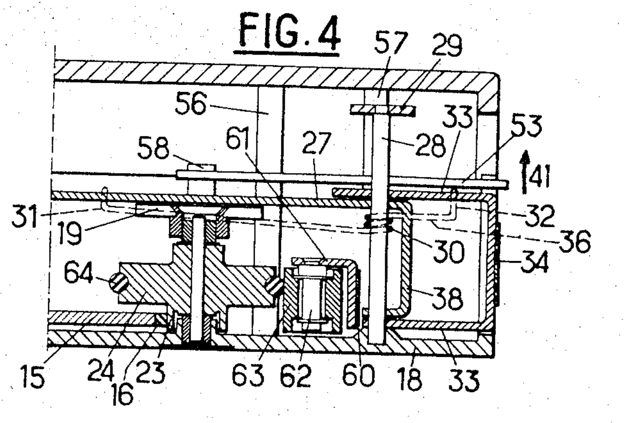
FIG. 4 is a section along the line IV—IV of FIG. 1.

In order to permit driving of the magnetic tape 4, it is pressed against the captan 14 by a presser roller 25 which is idly mounted on a pin 26. The pin 26 is rigidly connected to an oscillating lever 27. Lever 27 is pivoted on a pin 28, as shown in FIG. 4, and arranged between the partition 18 and a guard 29 fastened above the partition 19. The pressure of the roller 25 against the capstan 14 is supplied by a spring 30 arranged around the pin 28 so that end 31 biases the lever 27. The other end 32 is hooked in the bottom 33 of a lever 34 which serves to lock the magazine 1 in position in the recorder. The lever 34 is held in position by its hook shaped end portion 35.

In this way, one can, by unhooking lever 34 and rotating it about the pin 28, release the pressure of the roller 25 by overcoming the tension of spring 30. Also, by the arm 36 of the spring 30 striking against the bottom of a notch 37 provided in the back 38 of the lever 27, the roller 25 will be moved backward until it comes into position in a notch 39 provided in the upper wall of the housing 1. An identical notch 40 is of course provided in the lower wall by way of symmetry.

Figure 3:
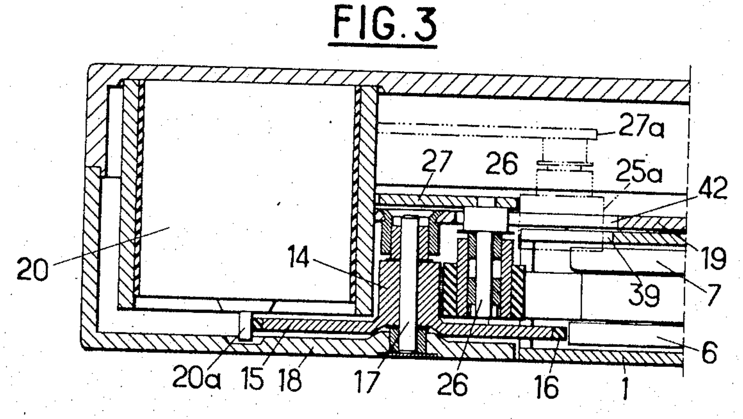
FIG. 3 is a section along the line III—III of FIG. 1.

It is then possible, by displacing the lever 34 laterally in the direction indicated by the arrow 41 and by sliding the base 33 on the pin 28, to bring the lever 27 into the position 27*a*, shown in FIG. 3. In this position, the roller 25, whose contour is shown in 25*a*, moves laterally via the notch 39 and an opening 42 provided in the partition 19. It is thus possible to withdraw the magazine 1 in the direction indicated by the arrow 43. The magazine slides in the housing in the manner of a drawer due to one or more ribs 44 rigidly connected with its end walls and sliding in suitable grooves in the recorder housing. A locking lever 45, similar to the lever 34 but pivoted merely on a pin 46 without action on the mechanism and without lateral displacement, is arranged at the other end of the magazine 1 to complete the locking thereof.

In order to assure the braking of the reels 2 and 3 of the magazine when the latter is removed from the recorder so as to avoid the tape unwinding, the magazine has a braking device consisting of two bent blades 47. The longer arms 48 of the blades 47, pushed by a common leaf spring 49, act simultaneously on the two flanges 6 and 7 of the two reels 2 and 3. Conversely, when the magazine is placed in position in the recorder, the action of the braking device is eliminated due to two push members 50, which are rigidly connected respectively with the levers 34 and 45. The push members, through suitable orifices provided in the walls of the housing and of the magazine, against the shorter arms 51 of the bent levers 47 to move the arms 48 out of contact with the flanges of the reels. At the same time, the push members 50 serve to lock the magazine in position in the housing.

Furthermore, in order to assure the braking of the feed reel 2 when the magnetic tape 4 is driven between the capstan 14 and the presser roller 25, a drive roller 52 is provided. The periphery of roller 52 has a rubber covering which rolls on the periphery of flange 6 of the reel 2. The wheel 52 is idly mounted on its shaft with a slight frictional drag.

Finally, the mechanism comprises a control member 53 provided with a linear slot 54 and an L-shaped slot 55, as shown in FIG. 1. Stationary pins 56 and 57 are passed through the slots 54 and 55, respectively. The control member 53 has a spur 58, which can come into contact with the oscillating lever 27 and a vertically bent part 59 on which resilient blade 60 is fastened. On the end of blade 60, there is mounted an angle iron 61, visible in FIG. 4, which bears a pin 62. A roller 63 is mounted for idle rotation about pin 62 and is adapted to bear against a rubber covering 64 borne by the periphery of the flywheel 24 and against the rubber covering of the drive roller 52, as previously stated.

In the position shown in solid lines in FIG. 1, the resilient blade 60 is substantially at rest and the roller 63 is spaced at a short distance from the drive roller 52.

It is therefore apparent that, when the device is in use, the magnetic tape 4 will be driven from the reel 2 toward the reel 3 by the capstan 14 against which the tape is pressed by the presser roller 25. The tape will be stored on the reel 3 which is driven by the wheel 15 and by the friction flange 7 of the reel. The reel 2, which acts as feed reel, is simply braked by the drive roller 52.

If the control member 53 is moved in the direction indicated by the arrow 64 about the pin 56 up to point 53*a*, which is made possible due to the circular-arcuate portion of the port 55 which is diposed around the pin 57, the spur 58 will act on the oscillating lever 27 to move the roller 25 away to the position indicated by 25*a*. The magnetic tape then instantaneously ceases to be driven. It is sufficient that the friction drive torque transmitted by the flange 7 to the hub of the reel 3 be less than the braking introduced by the drive roller 52.

If after having effected swinging of the control member 53, the latter is pushed in the direction 65 until it comes to rest at 53*b*, which is made possible by the shape of the slots 54 and 55, the roller 63 is moved from 63*a* to 63*b* while at the same time the resilient blade 60 is bent to a loaded condition by the preceding inward motion. In its position 63*b*, the roller 63 also assures a transmission movement between the inertia flywheel 24, which turns constantly in the direction 24*a* and the drive roller 52, which is driven in the direction indicated by the arrow 66. The roller 52 will drive the reel 2 in the direction of rewinding, that is to say, in the direction indicated by the arrow 67. This is made possible by the fact that the wheel 52 acts directly on the flange 6 which is rigidly connected with the hub 5 of the reel 2, while the wheel 15 continues to act on the reel 3, but on the friction flange 7.

The magnetic tape is rewound from the reel 3 toward the reel 2 at a speed greater than that of normal travel, due to the dicerences in diameter between the parts 14 and 15, and 23 and 24. Upon releasing of the pressure on the control member 53, it resumes its initial position under the force of the blade 60, thus assuring the drive in normal direction at the recording and playback speed.

The envelope 1 of the magazine has slots 68 therein making it possible to actuate the reels 2 and 3 by hand in order to take up that portion of the magnetic tape emerging from the notch when the magazine is removed from the recorder. It is furthermore possible to provide, in the two upper and lower walls of the magazine, a window which makes it possible to verify the normal unwinding of the reels when the magazine is in either of its two possible positions. It can be seen from FIG. 2 one wall of the magazine will serve as an extension of one wall of the recorder so that a window of the above described type would always be visible.

As an alternative, the magazine could also be inserted perpendicularly to the preceding direction, that is to say, parallel to the axis of the reels and of the capstan. The lateral retraction movement of the presser roller 25 could then be dispensed with, but nevertheless it would be possible to retain a small displacement in longitudinal direction in order to assure, at the end of loading, contact between the reels 2 and 3 respectively with the driver roller 52 and the wheel 15.

The mechanism thus described makes it possible to provide a tape recorder of very small dimensions by adding, in the same housing, an electronic transistorized amplifier, a loudspeaker and supply battery. It also makes it possible to produce, in even smaller dimensions, a tape playback machine alone which simply comprises supply batteries and a reduced power amplifier to permit listening with earphone. In this case, the entire left-hand portion of FIG. 1 may be eliminated and the assembly of batteries and amplifier can be housed above the partition 19 mentioned above.

It will be understood that the embodiment described above is not limitative and to it may be imparted any desirable changes, without thereby going beyond the scope of the invention.

What is claimed is:

1. A drive system for miniature magnetic recorders comprising a substantially symmetrical magazine, two reels rotatably mounted in said magazine, a magnetic tape wound between said reels, each said reel comprising a cylindrical hub having a first flange rigidly connected on one end and a second flange frictionally connected on the other end, and means for driving said tape and said reels comprising, in combination, a capstan, a large wheel rigidly connected to said capstan, an electric micro-motor operatively connected to frictionally drive said large wheel along its periphery, an inertia flywheel and flange of one of said reels serving as a take-up reel being frictionally driven by said large wheel; an oscillating arm, a presser roller mounted on said arm, spring biasing means biasing said arm so that said roller presses said tape against said capstan, a drive roller rolling on the first flange of the other of said reels and contributing to the braking thereof, a small roller movably mounted between a first position contacting both said flywheel and said drive roller and a second out-of-contact position, spring biasing means biasing said small roller towards said second position; and a control member consisting of a movable part which in a first position displaces said oscillating arm to move the presser roller away from said capstan and, in a second position, resiliently presses said small roller between the periphery of the flywheel and the periphery of the drive roller to effect high speed rewinding of the tape.

2. A drive system according to claim 1 further comprising a first locking lever for the magazine which is pivoted on the same shaft as the oscillating arm, said first locking lever assuring the locking of the magazine in position in the loaded condition and acting on the oscillating arm to effect the freeing of the magazine and the release and lateral retraction of the presser roller to permit the longitudinal removal of the magazine.

3. A drive system according to claim 2 further comprising a second locking lever similar to the first locking lever being provided on the side of the magazine remote from said first locking lever.

4. A drive system according to claim 1, in which the magazine is introduced and removed transversely in the direction of the axis of the capstan, the roller being simply freed by actuating the aforementioned control member.

5. A drive system according to claim 1 further comprising a double brake which resiliently engages with the stationary flanges of the two reels, push members rigidly connected with the locking levers in the locked position releasing said brake.

6. A drive system according to claim 4 in which the magazine further comprises a double brake which resiliently acts on the stationary flanges of the two reels, by push members rigidly connected with the housing of the apparatus and engaging with said brake when said magazine is loaded into said recorder to effect a release of said brake.

References Cited

UNITED STATES PATENTS

| | | | |
|---|---|---|---|
| 3,078,464 | 2/1963 | Lyon et al. | 242—55.13 |
| 3,258,215 | 6/1966 | Ono | 242—55.13 |
| 3,291,409 | 12/1966 | McClellan | 242—55.12 |

LEONARD D. CHRISTIAN, *Primary Examiner.*